Figure 1:
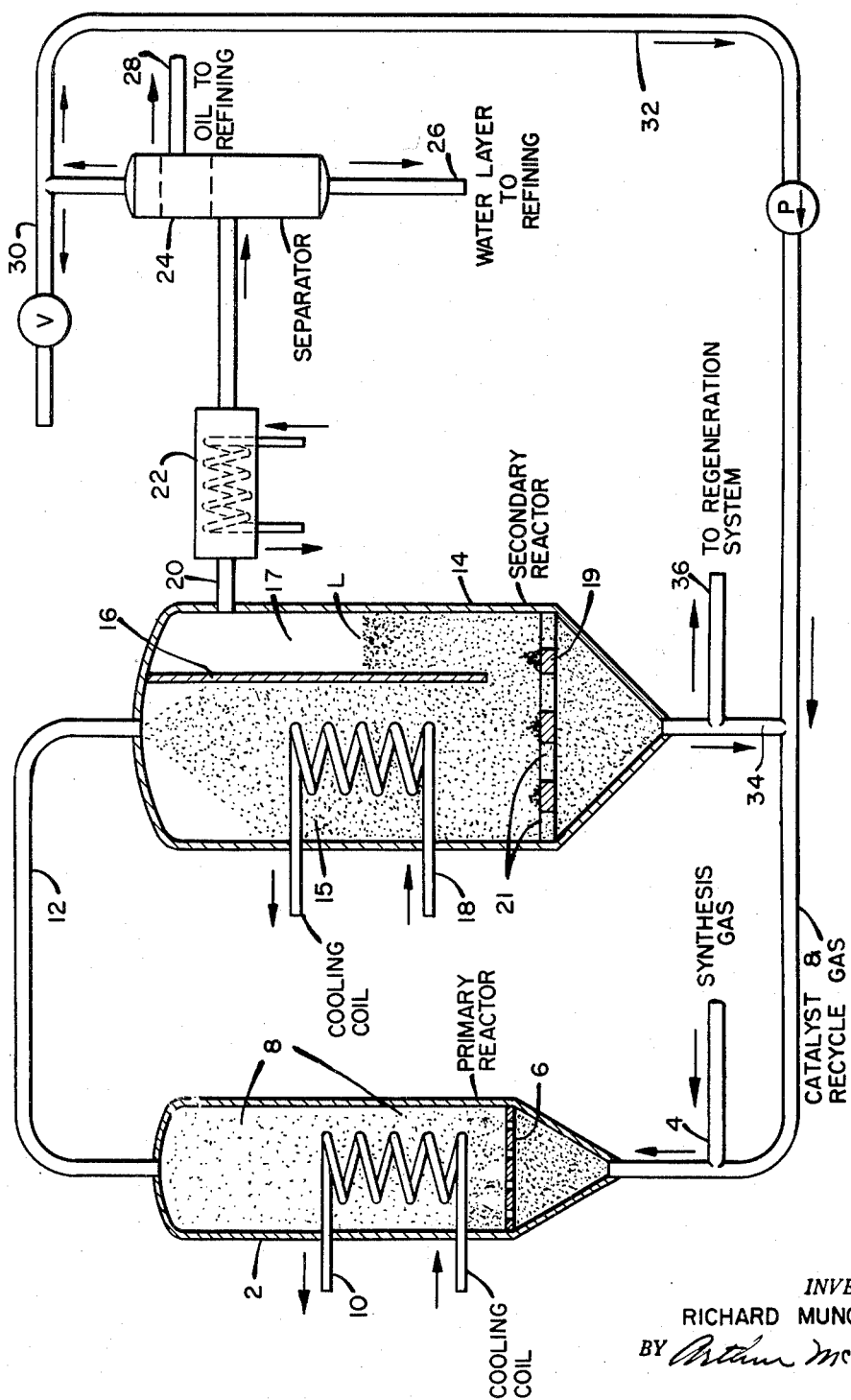

INVENTOR.
RICHARD MUNGEN

United States Patent Office 2,779,777
Patented Jan. 29, 1957

2,779,777

METHOD FOR IMPROVING CONTACT OF GASEOUS REACTANTS WITH CATALYST

Richard Mungen, Tulsa, Okla., assignor to Stanolind Oil and Gas Company, Tulsa, Okla., a corporation of Delaware Application December 29, 1952, Serial No. 328,274

6 Claims. (Cl. 260—449.6)

The present invention relates to an improved method and means for effecting chemical reactions and particularly reactions of the type involved in the synthesis of hydrocarbons from carbon monoxide and hydrogen.

Originally such reactions were carried out under conditions utilizing fixed beds of catalyst; and, while such embodiments have been widely used abroad, the problem of finding an economical means for removing generated heat from the reaction zone and the elimination of hot spots therein proved to be one of the chief disadvantages of such a process. Later on, adaptation of the now well-known fluidized catalyst technique was proposed and resulted in a practical and economical solution to the problem of heat transfer. Although the utilization of fluid bed operation has served well in handling the temperature-control problems accompanying exothermic reactions of this type, such technique has not met with unqualified success. Thus, in the case of hydrocarbon synthesis, it has been found that with commercial plants designed to produce approximately 6,000 barrels per day of liquid hydrocarbons by the reaction of carbon monoxide with hydrogen in the presence of a fluidized catalyst, the yields are less than half those expected, based on results previously obtained with pilot plant fluid bed operations. Stated otherwise, if a fluid reactor 8 inches in diameter and a fluid reactor 16 feet in diameter are operated under the same conditions, for example, catalyst temperatures of 650° F., 400 p. s. i. g. pressure, and 12 standard cubic feet of carbon monoxide and hydrogen per hour per pound of iron catalyst space velocity, the conversion of fresh feed hydrogen plus carbon monoxide is 90 percent and 45 percent in the 8 inch and 16 foot fluid beds, respectively. This discrepancy in conversion is believed to be due to poor gas-solids contacting in the reactor of larger diameter. It has also been demonstrated that in small fixed beds the relative activity of the same catalyst is one hundred times greater than in a fluid bed of large diameter. This marked difference of relative catalytic activity in the fluid and fixed bed systems can be explained by assuming that two factors limit the rate of reaction: first, the reaction on the catalyst surface, which is rapid, as shown by the high catalytic activity in fixed beds; and second, the mass transfer of gases to the catalyst surface, which is a diffusion process, and is much more limiting than the factor first mentioned. The most serious drawback of the fluid bed is the poor gas-solids contacting. Large bubbles of gas pass through the fluidized bed without an opportunity to reach the catalyst surface. In a fixed bed, however, the gas follows a tortuous path through many minute spaces between the catalyst particles and has a far greater opportunity of diffusing to the catalyst surface. A system which approaches the gas-solids contacting behavior of the fixed bed, and which preserves the favorable heat transfer characteristics of a fluid bed, would accordingly be highly desirable.

To approximate on a commercial scale the high conversions obtained in pilot plant operations, there are several possible solutions among which may be mentioned (1) the use of additional reactors of the same design as employed commercially with the same catalyst, (2) increase in the activity of the catalyst, (3) improvement of the conditions of contacting the gaseous reactants with the present catalyst or with a more active catalyst. The use of additional reactors with poor gas-solids contacting obviously is an expensive method of achieving high conversions since the addition of twice as many reactors would not avoid the problem of large gas bubbles passing upwardly through the reactor. To increase the activity of the catalyst appears to be a futile approach to the solution of the problem, since the catalyst is already very active as shown by results obtained in fixed bed operations. In addition, the limiting factor is not reaction rate on the catalyst but diffusion of the gases to the catalyst surface. Therefore, the most logical approach to a successful solution of the problem is to improve the gas-solids contacting since this phase thereof presents a much greater potential for improvement than the various other methods previously mentioned for increasing conversion. However, in attempting to achieve this end by the use of the foregoing or any other means, it should be remembered that successful operation must be possible under the following conditions:

1. Catalyst temperatures of 600° to 725° F. and pressures of 400 to 500 lb./sq. in. gage.
2. Highly exothermic reaction conditions.
3. Deposition of substantial quantities of wax and carbon on the catalyst during use.

Also, essentially complete conversion of the fresh feed carbon monoxide and separation of product gases and catalyst are required.

Accordingly, it is an object of my invention to provide a method for maintaining high fresh feed carbon monoxide conversions on a commercial scale of operations under conditions such that it will be possible to use less catalyst and smaller reactors than formerly required for this purpose. It is a further object of my invention to provide conditions of operation which will permit the use of coarser catalyst particles than previously believed satisfactory, thereby allowing for more efficient and simple separation of the catalyst from the product gases. Another object of my invention is to provide conditions permitting a higher rate of heat release in the zone where the bulk of the reaction occurs. A still further object of my invention is to provide a system or procedure capable of improving the gas-solids contacting efficiency in vapor phase reactions occurring in the presence of a finely divided fluidized catalyst and to, at the same time, retain the favorable heat transfer characteristics of a fluid bed.

In carrying out my invention, in accordance with a preferred embodiment thereof, I employ a system of two reactors, the first being of relatively small diameter through which the reactant gases and catalyst flow upwardly into a dilute phase. The second reactor is of substantially greater cross section than the first and in this larger reactor the gases and catalyst taken from the first reactor flow downwardly therethrough and are separated in the reactor prior to recycling of the catalyst and unconverted gases back to the first stage of the process. The conditions employed in the first or primary reactor are such that the catalyst particles are readily carried over into the second reactor. Owing to the fact that the catalyst in the first reactor is maintained in a highly turbulent state, a very good heat transfer coefficient is achieved. In the first reactor, the conversion of total feed carbon monoxide is maintained at from about 50 to about 75 percent; and to obtain this condition, space velocities of from about 10 to about 25 s. c. f. h. CO/lb. Fe should be employed. The first reactor may be from about 15 to about 30 feet high and from 2 to 4 feet in diameter and has a moderately dense (80 to 120 pounds/cubic foot) fluid bed of catalyst, the depth of which may vary from about 2 to about 10 feet. The catalyst and product gases flow into the top of the second reactor in which the bed has settled but is continuously falling into a suitable gas-solids separating zone. While this downwardly moving bed approaches to some extent the characteristics of a fixed bed, it has numerous advantages thereover. Thus, for example, owing to the fact that the bed is sliding parallel to a cooling surface, the heat transfer is far superior to that obtainable in a conventional fixed bed. Also the efficiency of the catalyst throughout the bed is substantially higher than that of the fixed bed catalyst since the catalyst in the aforesaid moving bed is in a more uniformly reduced state. In this connection it is known that in fixed bed operations, the catalyst at the inlet side of the bed is in a higher state of reduction than that present at or near the exit side, thus tending to lower the over-all efficiency of the fixed bed catalyst. Moreover, any waxy deposits which tend to collect on the catalyst particles in the slowly moving bed, which may be operated at temperatures of from about 600° to 650° F., may be continuously removed to a very substantial degree by returning such catalyst to the first reactor which may, if desired, be operated at a temperature of 50° to 100° F. higher than the zone holding the slowly moving bed, although the first reactor may be operated at temperatures over a range of from about 580° to 725° F. In any event, however, the temperature prevailing in both reactors should not fall below about 580° F.

In the second reactor which may be from 20 to 30 feet high and from 15 to 20 feet in diameter, when operated in combination with a first reactor having the approximate dimensions listed above, the bed depth may be from about 4 to about 10 feet and the settled density of the catalyst may vary from about 135 to 160 pounds/cubic foot. The contacting of the gases with catalyst in the second reactor is similar in this respect to the conditions provided by a fixed bed, but the rate of fall of the catalyst is adjusted to provide sufficient heat transfer to control the reaction temperature. The rate of fall of the catalyst is in turn determined by the diameter of the second reactor and the volume of gas fed to the first reactor. Generally the rate of fall of the catalyst in the second reactor should be from about $\frac{1}{30}$ to about $\frac{1}{60}$ the rate of gas flow. Linear gas velocities in the second reactor should range from about 0.2 to about 1.0 foot per second, while in the first reactor they may range from about 2.0 to about 10.0 feet per second.

While the specific catalyst employed in a system of the type outlined above may be any of a wide variety of previously used materials, I normally prefer in hydrocarbon synthesis operations to employ a catalyst derived from iron mill scale, especially iron mill scale having a particle size ranging from about −40 to about +100 mesh. Mill scale catalyst is conveniently prepared in accordance with the procedure described in U. S. Patent No. 2,485,945, granted October 29, 1949, to S. W. Walker. By the procedure there described, the catalyst is manufactured from oxide scale or layer obtained by rolling iron or various alloys thereof at elevated temperatures, for example, in the range of 1000° to 1300° C. Microscopic examination of the scale or layer thus obtained when ground to the desired order of fineness indicates that it still retains its characteristic plate-like structure.

In regard to other operating requirements it may be said that such conditions as already known to be suitable for hydrocarbon synthesis are satisfactory. In the majority of instances, however, I prefer to use a synthesis gas having hydrogen and carbon monoxide in a ratio of from about 1.5:1 to about 2.0:1; pressures of from about 400 to about 500 p. s. i., preferably from about 350 to 450 p. s. i.; and a recycle ratio of from about 1.2 to about 1.7 volumes of recycle gas per volume of fresh feed as generally set out in my copending application U. S. Serial No. 163,863, filed May 24, 1950, with J. E. Latta.

Figure 2:
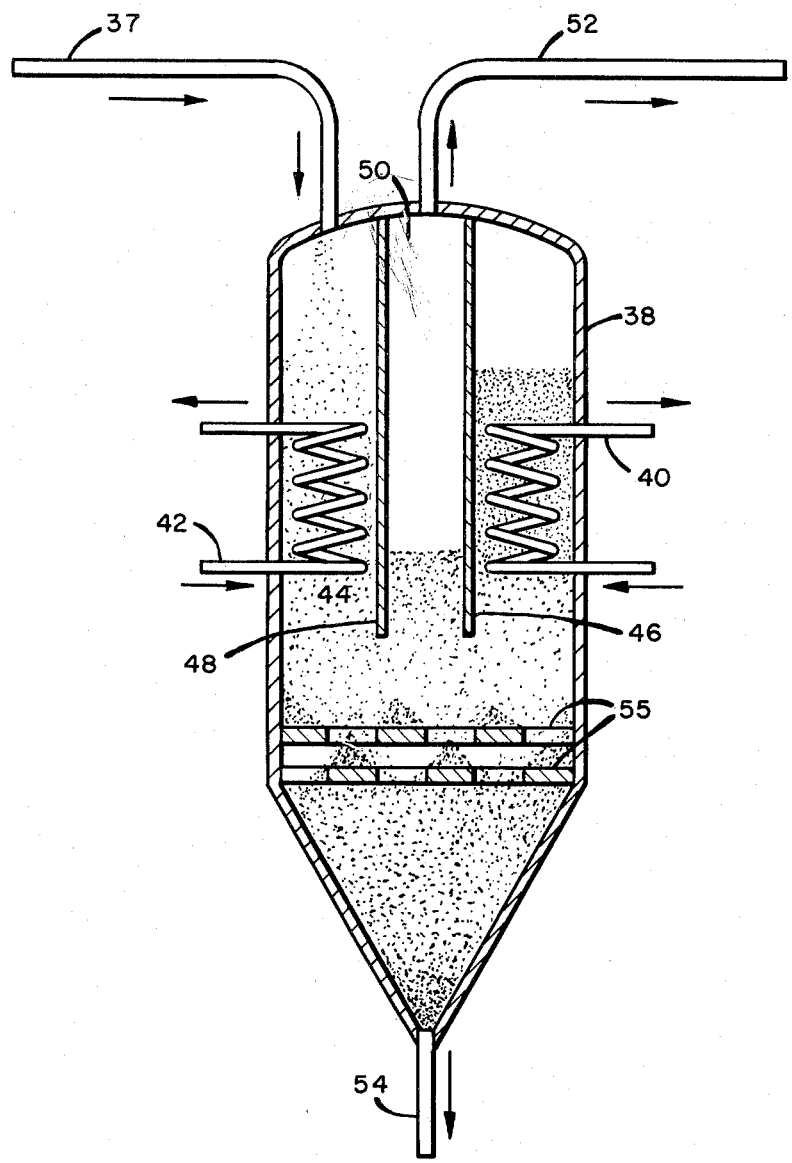

My invention may be more specifically illustrated by reference to the accompanying drawings, the description of which is to be interpreted in light of the foregoing discussion, and wherein Figure 1 is a schematic representation of one complete embodiment of my invention, while Figure 2 illustrates an additional embodiment of a secondary reactor used to handle the downwardly moving catalyst bed and which may be employed in combination with a relatively small fluid bed reactor of the type contemplated.

Thus, in Figure 1, synthesis gas containing hydrogen and carbon monoxide in a ratio of 1.8:1 is added to the bottom of reactor 2 through line 4 and then passed upwardly through grid 6 into a mass of fluidized iron mill scale catalyst 8 which, as shown in the drawing, is more dense near the bottom of the bed than in the region above the aforesaid lower portions thereof. Linear gas velocities employed in reactor 2 range from about 6 to 8 feet per second, the temperature used varies from 650° to about 725° F., and the pressure ranges from 400 to 450 p. s. i. A total feed carbon monoxide conversion of about 60 percent is maintained in reactor 2 by employing space velocities of the order of from 12 to 15 s. c. f. h. CO/lb. Fe. Removal of heat generated by the reaction of carbon monoxide with hydrogen is effected by the use of a cooling means 10 which may be an ordinary coil through which is forced a suitable heat transfer agent, such as diphenyl or water, in heat exchange relationship with the catalyst in the reaction zone. Under these conditions a very substantial amount of catalyst is entrained in the product gases passing out of the reactor through line 12 into secondary reactor 14 where the product gases as well as unconverted gaseous reactants contact a slowly downwardly moving catalyst bed 15 to which catalyst is continuously added through line 12. The rate of drop of catalyst bed 15 in the reaction zone of reactor 14 is from about $\frac{1}{35}$ to about $\frac{1}{45}$ the rate of gas flow. Further reaction between said gaseous reactants is effected by contacting the latter with the catalyst in bed 15 at temperatures in the range of from 600° to 625° F. Heat of reaction generated in the catalyst bed in excess of that required to sustain the aforesaid temperatures is removed from the system by means of cooling coils 18. The main portion of the catalyst coming in contact with the gaseous reactants is maintained in a relatively confined zone by means of a baffle 16 which may extend from about $\frac{2}{3}$ to about $\frac{9}{10}$ the length of the reaction zone. This baffle also serves as a gas-solids disengaging means and as a means for retarding the free flow of catalyst through reactor 14. By the time the gases have reached the disengaging zone 17, the reaction is substantially complete; hence, no heat transfer surface is required at this point. The rate of fall of bulk catalyst 15 through reactor 14 and the subsequent removal thereof from the latter is at least partially controlled by grid 19, having relatively large openings 21. The presence of grid 19 is optional inasmuch as the flow of catalyst may be obstructed by other means hereinafter enumerated. Gases liberated at level "L" of catalyst bed 15 are withdrawn from the reactor through line 20, condenser 22, and the resulting liquid condensate and uncondensed gases sent to separator 24. The water product phase is withdrawn from the system through line 26, while the oil product layer is taken off through line 28. Both of these streams may be sent to separate refining plants where their original components are obtained in marketable form. Uncondensed gases are taken off through line 30 and a portion thereof is recycled through line 32 to line 34 where it picks up catalyst as it falls slowly through the reaction zone of reactor 14. This gaseous mixture of catalyst in line 34 is then combined with synthesis gas in line 4 and the catalyst in this manner is returned to primary reactor 2. Periodically catalyst in line 34 may be sent through line 36 to a suitable regeneration system and the catalyst returned for further use.

Figure 2 is a diagrammatic illustration of another reactor design, which may be substituted for secondary reactor 14 shown in Figure 1, wherein product gases and entrained catalyst are introduced through line 37 into reactor 38 equipped with cooling means 40 and 42 which serve to maintain the temperature of the slowly falling catalyst bed 44 at the desired value. Baffles 46 and 48 form a gas-solids disengaging section 50 from which product gases are removed through line 52 and processed in accordance with the scheme shown in Figure 1. Descending catalyst in the bed 44 is withdrawn from the reactor through line 54 and handled as indicated in the description of Figure 1. Downward flow of the catalyst is controlled by the rate at which it passes through grid plates 55.

In operating the secondary reactor it is important that suitable means be provided for adequately obstructing the downward flow of catalyst. This object may be accomplished in a number of ways such as, for example, by providing the cooling tubes in the reactor with fins; by overlapping baffles slanting downwardly into the center of the reaction zone, spaced sufficiently far apart and at an angle suitable for permitting the free downward flow of catalyst to the bottom of the reactor; by effecting cooling of the reaction zone with an increased number of cooling units, etc., having a lower individual cooling capacity; and the like.

Other modifications of my invention will be apparent from the foregoing description. For example, if desired, a separation system for recovering normally liquid synthesis products, both oil and water phases, from the first reactor, prior to adding the unconverted reactant gases to the second reactor, may be employed instead of taking the entire stream of gaseous products from the primary reactor and introducing them into the aforesaid secondary reactor, as described in the embodiment set forth above. Also, as previously indicated, the process of my invention is applicable to vapor phase reactions in general employing finely divided particles of materials as a catalyst for said reactions, the conditions for effecting such reactions insofar as concerns conversion in the first reaction zone, linear velocities in said first reaction zone and the rate at which the bulk catalyst settles out in the second reaction zone compared to the rate of gas flow in said second zone being essentially the same as those specifically taught herein in applying the process of my invention to hydrocarbon synthesis.

What I claim is:

1. In a process for improving the contact of gaseous reactants with finely divided catalyst particles in gas or vapor phase reactions, the improvement which comprises introducing said reactants into the lower portion of a first reaction zone containing a highly turbulent fluidized catalyst bed under conditions such that only from about 50 to 75 percent of said reactants are converted, said gaseous reactants being introduced into said first reaction zone at a linear velocity of from about 2 to about 10 feet per second; transferring overhead product gases, unconverted reactants and entrained catalyst through a passageway of substantially less cross-sectional area than said first reaction zone, introducing said unconverted reactants and entrained catalyst near the upper portion of a first confined zone within a second reaction zone, said first confined zone having a substantially larger cross-sectional area than said passageway whereby downward flow of product gases, gaseous unconverted reactants and catalyst is effected in said first confined zone to further convert said reactants into valuable products; withdrawing said products and remaining unconverted reactants from said downwardly flowing catalyst at the base of said confined zone; allowing said product gases and unconverted reactants to rise upwardly through still another separate confined zone partially filled with a substantially turbulent mass or catalyst, said last mentioned confined zone also being within said second reaction zone, withdrawing the resulting gaseous mixture from the latter; allowing catalyst in said first confined zone to move continuously downwardly at a rate corresponding to from about 1/30 to about 1/60 the rate of gas flow in said second reaction zone; and returning said catalyst to said first reaction zone.

2. In a process for the synthesis of hydrocarbons by the reaction of carbon monoxide with hydrogen in the presence of an iron hydrocarbon synthesis catalyst under otherwise known conditions; the method for improving contact of carbon monoxide and hydrogen with the catalyst which comprises feeding hydrocarbon synthesis gas into a primary reaction zone containing a fluidized highly turbulent bed of hydrocarbon synthesis catalyst at a space velocity of from about 10 to about 25 s. c. f. h. CO/lb. Fe, and at a linear gas velocity of from about 2 to about 10 feet per second; transferring overhead product gases, unconverted reactants and entrained catalyst through a passageway of substantially less cross-sectional area than said first reaction zone, introducing said unconverted reactant and entrained catalyst near the upper portion of a first confined zone within a second reaction zone, said first confined zone having a substantially larger cross-sectional area than said passageway whereby downward flow of product gases, gaseous unconverted reactants and catalyst are effected in said first confined zone to further convert said reactants into valuable products; withdrawing said products and remaining unconverted reactants from said downwardly flowing catalyst at the base of said first confined zone; allowing said product gases and unconverted reactants to rise upwardly through still another separate confined zone partially filled with a substantially turbulent mass of catalyst, said last mentioned confined zone also being within said second reaction zone, withdrawing the resulting gaseous mixture from the latter; allowing catalyst in said first confined zone to move continuously downwardly at a rate corresponding to from about 1/30 to about 1/60 the rate of gas flow in said second reaction zone; and maintaining substantially the same temperature in said second reaction zone as is employed in the primary reaction zone.

3. The process of claim 2 in which space velocities in the primary reaction zone range from 12 to 15 s. c. f. h. CO/lb. Fe, and wherein the bulk catalyst in the second reaction zone falls at a rate of from about 1/35 to about 1/45 of the gas flow in said second reaction zone.

4. The process of claim 2 in which an iron mill scale hydrocarbon synthesis catalyst is employed.

5. The process of claim 2 in which the catalyst withdrawn from the second reaction zone is combined with recycle gas and introduced into the primary reaction zone.

6. In a process for the synthesis of hydrocarbons by the reaction of carbon monoxide with hydrogen in the presence of a hydrocarbon synthesis catalyst under otherwise known conditions the method for improving contact of carbon monoxide and hydrogen with the catalyst which comprises feeding hydrocarbon synthesis gas into a primary reaction zone containing a fluidized highly turbulent bed of hydrocarbon synthesis catalyst at a temperature of from about 650° to about 725° F.; transferring overhead product gases, unconverted reactants and entrained catalyst through a passageway of substantially less cross-sectional area than said first reaction zone, introducing said unconverted reactant and entrained catalyst near the upper portion of a first confined zone within a second reaction zone, said first confined zone having a substantially larger cross-sectional area than said passageway whereby downward flow of product gases, gaseous unconverted reactants and catalyst are effected in said first confined zone to further convert said reactants into valuable products; withdrawing said products and remaining unconverted reactants from said downwardly flowing catalyst at the base of said confined zone; allowing said product gases and unconverted reactants to rise upwardly through still another separate confined zone partially filled with a substantially turbulent mass of catalyst, said last mentioned confined zone also being within said second reaction zone, and withdrawing the resulting gaseous mixture from the latter; allowing catalyst in said first confined zone to move continuously downwardly at a rate corresponding to from about $\frac{1}{30}$ to about $\frac{1}{60}$ the rate of gas flow in said second reaction zone; maintaining the temperature in said second reaction zone at a level of approximately 50° to 100° lower than that employed in said first reaction zone; and introducing the catalyst withdrawn from said second reaction zone into said primary reaction zone.

References Cited in the file of this patent
UNITED STATES PATENTS

| | | |
|---|---|---|
| 2,428,914 | Kassel | Oct. 14, 1947 |
| 2,481,089 | Dickinson | Sept. 6, 1949 |
| 2,485,945 | Walker | Oct. 25, 1949 |
| 2,514,288 | Nicholson | July 4, 1950 |
| 2,515,373 | Keith | July 18, 1950 |
| 2,543,974 | Jewell et al. | Mar. 6, 1951 |
| 2,640,843 | Hill et al. | June 2, 1953 |